June 21, 1960          H. GOLDE          2,941,840

SLIDING CLOSURE PANEL FOR A VEHICLE ROOF

Filed Sept. 12, 1957          2 Sheets-Sheet 1

June 21, 1960     H. GOLDE     2,941,840
SLIDING CLOSURE PANEL FOR A VEHICLE ROOF
Filed Sept. 12, 1957     2 Sheets-Sheet 2
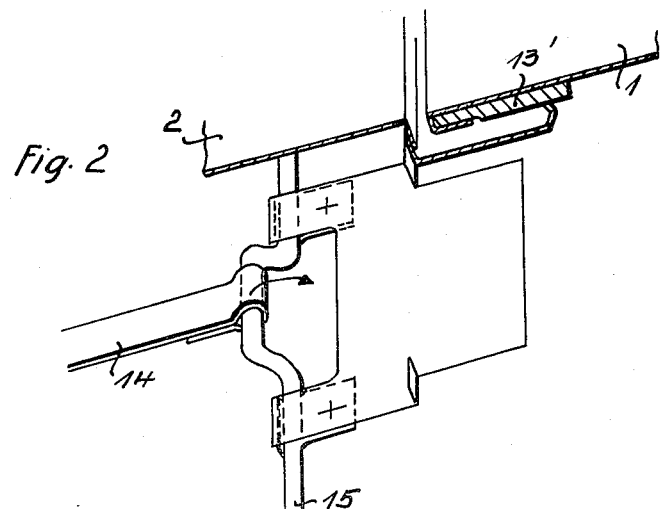
Fig. 2
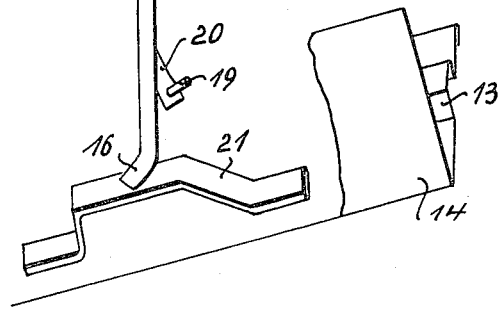
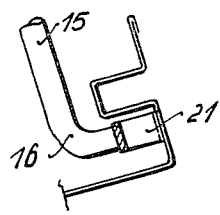
Fig. 3

United States Patent Office 2,941,840
Patented June 21, 1960

2,941,840

SLIDING CLOSURE PANEL FOR A VEHICLE ROOF

Hans Golde, Hanauer Landstr. 338, Frankfurt (Main), Germany

Filed Sept. 12, 1957, Ser. No. 683,514

Claims priority, application Germany Mar. 5, 1957

5 Claims. (Cl. 296—137)

This invention relates to sliding closures, and more particularly to sliding closures adapted for closing openings in vehicle roofs.

A particular application which is contemplated for the invention involves slidable tops for vehicles which are provided with fixed roof portions defining openings which are to be closed selectively. In such applications, it is convenient that the slidable closure be displaceable away from the associated opening to a position beneath the fixed roof portion where it is not only protected against external disturbance but is, furthermore, aesthetically out of sight.

In know structures which are provided to accomplish the aforementioned functions, rails are positioned beneath the fixed roof portion, the closure being slidable along the rails toward the opening. At the opening, the rails are provided with discontinuities which enable the closure to be elevated to a position flush with the fixed roof portion and into the opening.

It is an object of the invention to provide for facilitating the sealing of openings defined in structures such as vehicles.

It is furthermore an object of the invention to provide for displacing a slidable closure from a position lower than the fixed portion of a vehicle roof to a position flush with the fixed portion without the need for providing discontinuities in the rails which are provided for the support of the closure.

Still another object of the invention is to provide an improved closure structure realizing the aforegoing objects while being simple and economical to manufacture and in which the parts are readily accessible and easily maintained.

As a feature of the invention, there is provided a simple leverage system for raising a closure from its position beneath the level of the associated fixed portion to a position flush with the fixed portion and in the defined opening.

As a further feature of the invention, there is provided a braking system whereby the displaceable closure can be halted and locked in any desired position along the guiding rails.

Still another feature of the invention is the provision of the leverage and braking systems in operative combination whereby the two systems can be selectively controlled through the same means. As will be shown, the braking system need only function with the closure displaced from the opening and the leverage system need only function with the closure adjacent the opening and these two mutually exclusive prerequisites are utilized for purposes of simplifying the associated control.

Briefly, one non-limitative example of structure provided in accordance with the invention comprises a displaceable closure connected to slides by means of flexible connections. These connections may furthermore be resilient but in any event they permit a displacement of the closure between various positions one of which arranges the closure in the opening to be sealed. The slides are arranged in rails which need not be provided with slots or other discontinuities to enable the aforesaid movement of the closure by reason of the flexible connections.

The invention will be more clearly understood from the following detailed description taken in conjunction with the attached drawing in which:

Fig. 2 is a perspective partial view, seen from the top, of a control for elevating the closure into an opening, the view for the showing adjacent portions of the fixed top and the cover;

Fig. 3 is a side view of one end of the control shown in Fig. 2; and

Fig. 4 is a perspective top view of a braking system provided in accordance with the invention.

Figure 1:
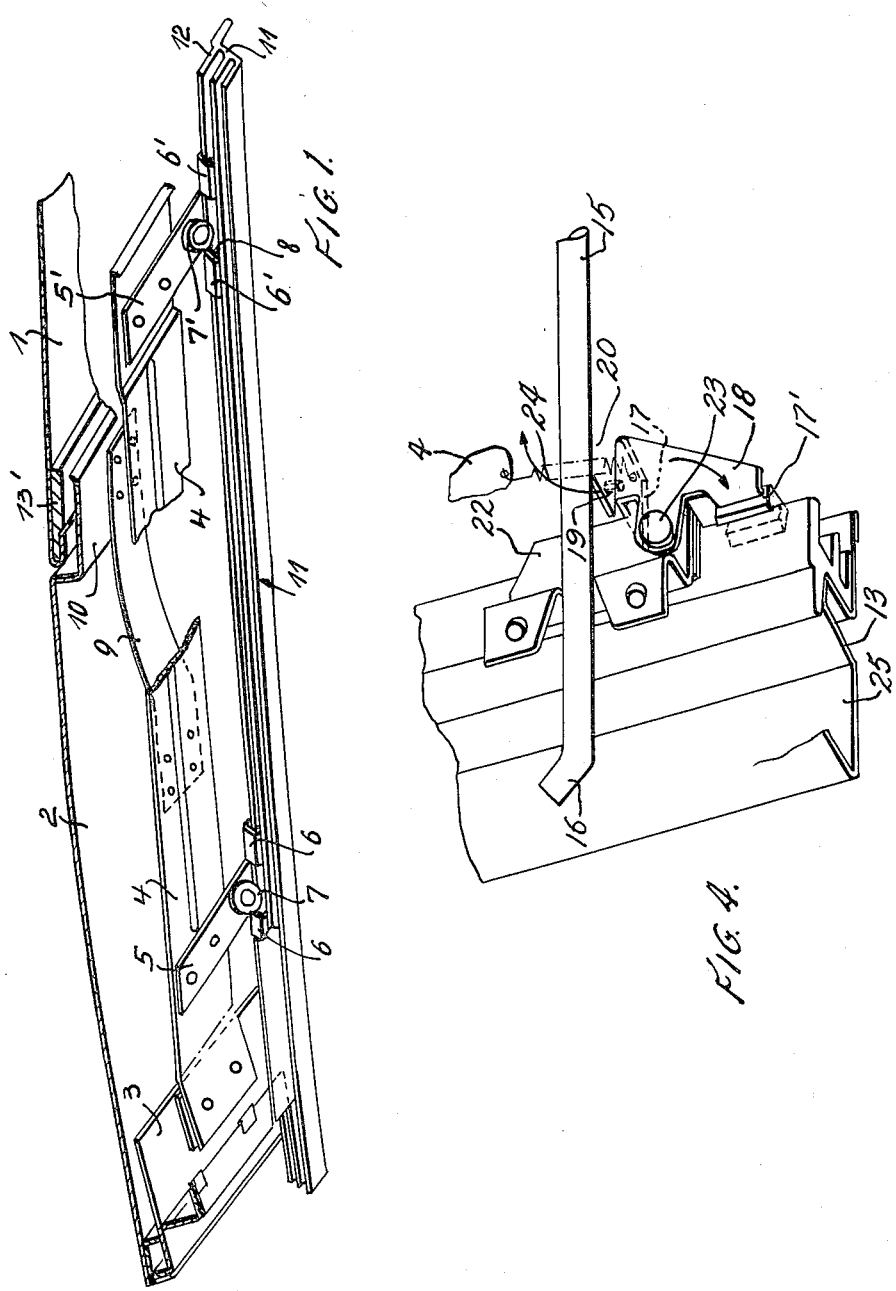
Fig. 1 is a perspective view of a longitudinal section of a displaceable closure or cover with a fixed portion of the top of a vehicle as seen from below.

Fig. 1 shows a longitudinal section of part of the fixed top 1 of a vehicle and a rigid sliding cover 2, which is in its front or closing position so that its rear edge abuts the frame member 13' of the top 1. The roof and closure may conventionally be planar or curved. The sliding cover 2 has a front brace 3 on each side of which is mounted a rearwardly projecting cantilever member or strap 4 of sheet metal. Fig. 1 illustrates only one strap 4 of two or more such straps. Strap 4 serves as carrier for slide bodies 5 and 5' which slide along lateral guide rails 11 which are mounted on frame 13 (Fig. 4).

Each strap 4 is a flexible and preferably resilient member which by virtue of these characteristics enables the displacement of the cover while maintaining engagement with the supporting rails.

More particularly, each strap carries a front and a rear slide body 5 and 5'. As shown in Fig. 1, the bodies 5 and 5' are approximately T-shaped. They are laterally adjustable relative to the associated strap 4 by means of screws and are rigidly secured to the strap 4 by means of said screws. U-sections 6 and 6' of the slide bodies 5 and 5' have an internal packing 8, for example, of felt. In addition, slide rollers 7 and 7' are rotatably positioned on each slide body.

In the illustrated embodiment, the guide rail 11 (which is one of two parallel rails) consists of an E-shaped section, the upper flange of which is engaged on both sides by the U-sections 6 and 6', while the rollers 7 and 7' roll along the narrow edge of the flange 12.

Since only the front end of the strap 4 is secured to brace 3 of the sliding cover 2 and since the strap 4 is a cantilever member having a certain elasticity, it is capable of executing a vertical swinging motion about its attachment to the brace 3.

The rear member 5' can therefore readily be moved perpendicularly with respect to the sliding cover 2. This is important as especially the rear part of the cover 2 (near rear transverse section 10) must be lowered and raised selectively whereas, as a result of the slight longitudinal curvature of the vehicle roof, the corresponding front part (near brace 3) of the cover 2 will always be on a lower level than the fixed top portion 1, so if the front part of the cover 2 has to be lowered at all, only a slight vertical displacement will be necessary. For stiffening the strap 4 and for guiding the swinging motion, it is advisable to provide for a connection between the strap 4 and the rear transverse section 10 of the sliding cover 2 in the form of an elastic metal strip 9.

Normally, the sliding cover is pulled downward by the elastic force of the strap 4 and of the elastic metal strip 9 unless there are special measures for example, in the closing position which provide that the cover 2 is braced upwardly with respect to the rear slide body 6' which engages the rail 12. These measures, as well as an appropriate brake device for fixing the sliding cover in any desired position are described below in relation to Figs. 2, 3 and 4.

Fig. 2 shows a transverse shaft or bar 15 which is positioned on the sliding cover 2 and which can be rotated by means of an arm or control 14 connected to an eccentric portion of the shaft. The two ends of the bar 15 are in the form of angular or radially extending attachments 16 which extend forwardly when the bar is in normal position. The sliding cover 2 is shown in lifted position. This position is assumed, during the advance of the cover, when the ends of the bar 15 slide up the sloping guide tracks of two ramps 21 fixedly arranged on both sides of the top frame 13. With the bar 15 atop ramps 21 with its ends 16 extending forwardly at an angle, these ends are swung downwardly by a rotation of the bar 15, so that the cover 2 is raised to an elevated position in the same plane as the top 1 of the vehicle.

Fig. 3 shows a section through the ramp 21 and the top frame 13 in position with the sliding cover lifted.

Fixed arms 20 (of which one is shown in Figs. 2 and 4) extend obliquely from and are arranged on both sides of the bar 15 close to its ends. A set screw 19 is inserted into a threaded bore of these arms 20. This arrangement serves to actuate a locking device arranged on the cover 2 and shown in Fig. 4.

For simplicity's sake, Fig. 4 does not show the cover 2, but merely a bracket 22 which is fastened on the cover by means of screws and on which is positioned a T-shaped plate 18 pivotable about a shaft 23. The two arms of the T-plate 18 are bent downwardly and one of these arms carries a brake block 17' made, for example, of rubber while the other arm 17 is pulled forward by a tension spring 24 secured to strap 4. The brake block 17' fixes the sliding cover in any position desired by frictionally engaging rail 11.

When the sliding cover is not in its front end position, the ends 16 of the control bar 15 are not adjacent the ramps 21, but slide freely in channels 25 of the top frame 13. A rotation of the bar 15 then only has the effect that the arm 20 is pivoted so that screw 19 strikes against the end 17 of plate 18 causing the same to pivot so that the brake block 17' is firmly urged against the upper flange 12 of the E-shaped guide rail 11. The sliding cover 2 can, in this manner, be fixed in any position desired by means of properly rotating the bar 15.

An adjustment of the brake power is simply achieved by changing the effective length of the screw 19. Since the plate 18 is positioned on the sliding cover, the brake block 17' is opposite the rail flange 12 only when the sliding cover is lowered. The ends 16 of rod 15, on the other hand, become operative for lifting the cover 2 only when the cover 2 has already been lifted by the ramps 21.

A conflict of the operations of the two attachments 16 and 20 on the control bar 15 can, therefore, never take place since the attachments 20 can only become operative for braking when the cover is lowered and the attachments 16 can only become operative when the cover is ready to be lifted.

The invention is, of course, not limited to the structural details of the embodiment given above by way of example.

What is claimed is:

1. A motor vehicle having a roof defining an opening comprising a rigid slidable panel adapted for closing said opening and adapted for being displaced to a position beneath said roof, linear guide rails on the vehicle adjacent said opening, guide members in constant engagement with said rails and slidable therealong, a resilient cantilever member affixed to said panel at one end thereof and extending longitudinally toward the other end, said cantilever member being connected to said guide members and urging said panel towards said guide members, and means for urging said panel away from said guide members against the force of said cantilever member.

2. A vehicle as claimed in claim 1 wherein said means comprises a crossbar rotatably mounted on said panel at said other end thereof, radial extensions on said crossbar, means on the vehicle against which said extensions can be thrust and means coupled to said crossbar for rotating the same whereby the movement of said extensions displaces the panel vertically and horizontally.

3. A vehicle as claimed in claim 2 comprising a control member on said crossbar, and a brake device pivotally mounted on the panel and responsive to the control member where the latter is actuated, for engaging at least one of said rails.

4. A vehicle as claimed in claim 3 wherein the control member is adjustable to control the braking force.

5. A vehicle as claimed in claim 2 wherein the first said means includes ramps fixed on the vehicle for engagement by said radial extensions.

References Cited in the file of this patent

UNITED STATES PATENTS

| | | |
|---|---|---|
| 1,928,003 | Bishop et al. | Sept. 26, 1933 |
| 2,155,357 | Creteur | Apr. 18, 1939 |
| 2,156,615 | Bishop et al. | May 2, 1939 |
| 2,193,607 | Votypka | Mar. 12, 1940 |
| 2,410,332 | Ball | Oct. 29, 1946 |
| 2,434,711 | Mobbs | Jan. 20, 1948 |
| 2,482,429 | Mobbs | Sept. 20, 1949 |
| 2,661,234 | Bishop | Dec. 1, 1953 |
| 2,772,917 | Goldman | Dec. 4, 1956 |

FOREIGN PATENTS

| | | |
|---|---|---|
| 751,332 | Great Britain | June 27, 1956 |